US010113346B2

(12) United States Patent
Kohlweiss

(10) Patent No.: US 10,113,346 B2
(45) Date of Patent: Oct. 30, 2018

(54) HINGE, IN PARTICULAR FOR A PIECE OF FURNITURE

(71) Applicant: Julius Blum GmbH, Hoechst (AT)

(72) Inventor: Franz Kohlweiss, Hard (AT)

(73) Assignee: JULIUS BLUM GMBH, Hoechst (AT)

( * ) Notice: Subject to any disclaimer, the term of this patent is extended or adjusted under 35 U.S.C. 154(b) by 200 days.

(21) Appl. No.: 15/141,024

(22) Filed: Apr. 28, 2016

(65) Prior Publication Data

US 2016/0237729 A1 Aug. 18, 2016

Related U.S. Application Data

(63) Continuation of application No. PCT/AT2014/000191, filed on Oct. 24, 2014.

(30) Foreign Application Priority Data

Nov. 15, 2013 (AT) ................................ A 890/2013

(51) Int. Cl.
*F16C 11/10* (2006.01)
*E05D 7/10* (2006.01)
(Continued)

(52) U.S. Cl.
CPC ................ *E05D 7/10* (2013.01); *A47B 96/00* (2013.01); *E05D 3/02* (2013.01); *E05D 5/02* (2013.01);
(Continued)

(58) Field of Classification Search
CPC ....... E05D 7/10; E05D 7/1005; E05D 7/1022; E05D 5/02; E05D 5/128; E05D 3/02;
(Continued)

(56) References Cited

U.S. PATENT DOCUMENTS

| | | | | |
|---|---|---|---|---|
| 124,627 A | | 3/1872 | Rathknecht | |
| 4,970,884 A | * | 11/1990 | Solow ................ | B60R 25/0225 70/209 |

(Continued)

FOREIGN PATENT DOCUMENTS

| | | |
|---|---|---|
| CN | 2183426 | 11/1994 |
| CN | 1099094 | 2/1995 |

(Continued)

OTHER PUBLICATIONS

Austrian Search Report dated Sep. 24, 2014 in corresponding Austrian Application No. 890/2013 (with English translation).
International Search Report dated Feb. 9, 2015 in corresponding International Application No. PCT/AT2014/000191 (with English translation).

*Primary Examiner* — Victor D Batson
*Assistant Examiner* — Matthew J Sullivan
(74) *Attorney, Agent, or Firm* — Wenderoth, Lind & Ponack, L.L.P.

(57) ABSTRACT

A hinge, in particular for a piece of furniture, comprises an inner hinge portion that can be attached to the furniture carcass or to a door hinged to the carcass, an outer hinge portion that can be attached to an outer door, a connecting device that connects the inner hinge portion to the outer hinge portion so that they can pivot relative to each other by three receiving members. The inner hinge portion has a main body that can be attached to the furniture carcass or to a door hinged to the furniture carcass. A lower receiving member is movable, preferably slidable, relative to an upper receiving member which is mounted, preferably rigidly, on the main body.

16 Claims, 7 Drawing Sheets

(51) Int. Cl.

| | |
|---|---|
| ***E05D 3/02*** | (2006.01) |
| ***E05D 5/12*** | (2006.01) |
| ***A47B 96/00*** | (2006.01) |
| ***E05D 5/02*** | (2006.01) |

(52) U.S. Cl.
CPC ...... *E05D 5/128* (2013.01); *A47B 2220/0072* (2013.01); *E05D 7/1005* (2013.01); *E05D 7/1022* (2013.01); *E05D 2003/025* (2013.01); *E05D 2003/027* (2013.01); *E05D 2007/1027* (2013.01); *E05D 2007/1038* (2013.01); *E05Y 2600/312* (2013.01); *E05Y 2600/314* (2013.01); *E05Y 2600/52* (2013.01); *E05Y 2600/528* (2013.01); *E05Y 2900/20* (2013.01)

(58) Field of Classification Search
CPC ........ E05D 2003/025; E05D 2003/027; E05D 2007/1027; E05D 2007/1038; E05Y 2600/312; E05Y 2600/314; E05Y 2600/52; E05Y 2600/528; A47B 96/00; A47B 2220/0072; Y10T 16/554; Y10T 16/535; Y10T 16/5353; Y10T 16/5357; Y10T 16/536; Y10T 16/5363; Y10T 16/5367
See application file for complete search history.

(56) References Cited

U.S. PATENT DOCUMENTS

| | | | | |
|---|---|---|---|---|
| 5,468,061 | A | 11/1995 | Fries et al. | |
| 6,360,401 | B1 | 3/2002 | Salice | |
| 6,925,685 | B2 * | 8/2005 | Chen | E05D 5/0246 16/239 |
| 2008/0083088 | A1 * | 4/2008 | Lin | E05D 11/1064 16/327 |
| 2013/0257248 | A1 | 10/2013 | Bedkowski et al. | |
| 2017/0044809 | A1 * | 2/2017 | Chiste | F16G 3/02 |

FOREIGN PATENT DOCUMENTS

| | | | | |
|---|---|---|---|---|
| CN | 1250131 | | 4/2000 | |
| DE | 1 584 006 | | 1/1970 | |
| DE | 1584006 | A1 * | 1/1970 | E05D 7/1022 |
| DE | 8703236 | | 7/1987 | |
| DE | 4307067 | A1 * | 9/1994 | E05D 5/02 |
| DE | 44 42 625 | | 6/1996 | |
| EP | 0 569 818 | | 11/1993 | |
| EP | 0 704 594 | | 4/1996 | |
| EP | 0 719 901 | | 7/1996 | |
| EP | 2636832 | A2 * | 9/2013 | E05D 5/0246 |
| JP | 2000-73643 | | 3/2000 | |
| WO | 89/04906 | | 6/1989 | |

* cited by examiner

HINGE, IN PARTICULAR FOR A PIECE OF FURNITURE

BACKGROUND OF THE INVENTION

The invention concerns a hinge, in particular for an article of furniture, including an inner hinge portion which can be fixed to a furniture carcass (furniture body) or to a furniture door pivotably mounted thereto, an outer hinge portion which can be fixed to an outer door, and a connecting device that is slideable in an inserting direction and which connects the inner hinge portion to the outer hinge portion pivotably relative to each other by a lower receiving device, an upper receiving device, and a central receiving device.

Hinges of that kind are already known and are shown, inter alia, in patent specification DE 444 2625 A1. Additional hinges of that kind are shown in EP 0569 818 A1, in DE 15 84 006 A1 and in DE 44 42 625 A1. Those hinges are used, for example, for an article of furniture equipped with folding doors. The folding doors are connected rotatably relative to each other by the hinges, and the connection of the hinge halves to the folding doors is often effected by positively locking or force-locking fixing elements. A hinge is generally made in two parts, and the two parts are rotatably connected together by way of a connecting element. In the mounting operation, folding doors are usually fixed to a furniture carcass which has already been set up. In that case, the first folding door is connected to the furniture carcass and the further folding doors are hung from the first folding door by the described hinges. Mounting of the hinges is effected at the inside of the folding doors in order to conceal them in the closed condition of the folding doors. The gap between the fitted folding doors should be as small as possible for visual reasons, for example in order not to be able to see into the article of furniture in the closed condition of the folding doors.

Particularly in the case of large heavy folding doors, it is often complicated for a folding door to be fitted to a folding door which is already fixed to the furniture carcass. The folding door on the one hand has to be lifted, aligned, held, and joined to the hinge. Often, the person who is assembling the article of furniture, during the operation of joining the doors to the hinges, has to align, hold and at the same time screw on the folding door when no second person who can help is available. In addition, it is difficult to insert the fingers into the very narrow gap between the folding doors to be able to hold and position the folding doors. All those disadvantages apply not only to fitment of the folding doors but also to removal thereof in the case of, for example, a moving house if the article of furniture were to be taken down. Without an additional person or without technical aids, care must constantly be taken to ensure that, for example, the seat of the positively locking or force-locking fixing elements between the hinge and the folding door is not damaged when they are removed. In the case of hinges equipped with a pin, the folding doors have to be introduced into the pin from above. That is often very difficult by virtue of the proportions and also the weight of the folding door, in particular when the gap between the doors is very small. In addition, if the doors have great weight and have sharp edges, there is even a serious risk of injury to the fingers.

SUMMARY OF THE INVENTION

The object of the invention is to avoid the above-described disadvantages, and to provide a hinge which is improved over the state of the art. That hinge should make it possible, for example, for the folding doors to be fitted without the assistance of a further person or an aid such as a support. In addition, the invention seeks to make it possible to be able to separate the folding doors from each other without having to use a tool for that purpose. The aim is to avoid a complicated procedure of lifting, positioning, and subsequently screwing or inserting into pins. Preventing fingers being jammed with the consequential injuries is an advantage arising out of the simplicity of the fitting operation.

In the case of the hinge according to the invention, that object is achieved in that the inner hinge portion has a main body which can be fixed to the furniture carcass or to the furniture door pivotably mounted thereto. The lower receiving device is slidable transversal (in a transverse direction) to the inserting direction of the connecting device, and relative to an upper receiving device which is mounted—preferably rigidly—to the main body.

BRIEF DESCRIPTION OF THE DRAWINGS

Further details and advantages of the present invention will be described in greater detail hereinafter via the specific description with reference to the embodiments by way of example illustrated in the drawings, in which:

FIGS. 4*a*, 4*b* through 8*a*, 8*b* show folding doors with pre-fitted hinges in various working steps.

DETAILED DESCRIPTION OF THE INVENTION

Exemplary preferred embodiments of the invention will be described in greater detail hereinafter with reference to the individual drawings.

Figure 1A:
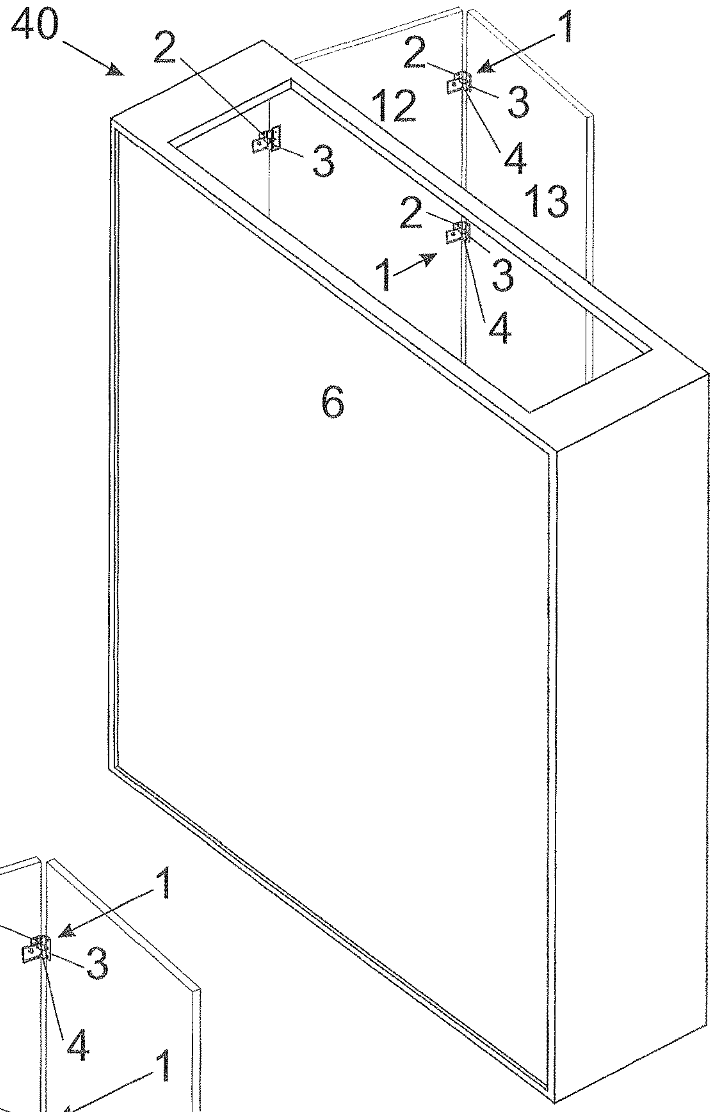
FIG. 1*a* shows a furniture carcass with fitted folding doors.

FIG. 1*a* shows a furniture carcass (body) 6 with folding doors 12, 13 already fitted in place. The carcass door 12 fixed to the furniture carcass 6 is already pivotably fixed to the furniture carcass with hinges 1 of the same or another structure. The inner hinge portion 2 of the hinge 1 is disposed on the carcass door 12. The outer hinge portion 3 is disposed at the outer door 13, a further folding door. The number of hinges 1 is determined in accordance with the respective weight and proportion of the folding doors. The inner hinge portion 2 and the outer hinge portion 3 are linked together by the connecting device 4. Thereupon, folding doors are mounted rotatably relative to each other by the connecting device 4.

Figure 1B:
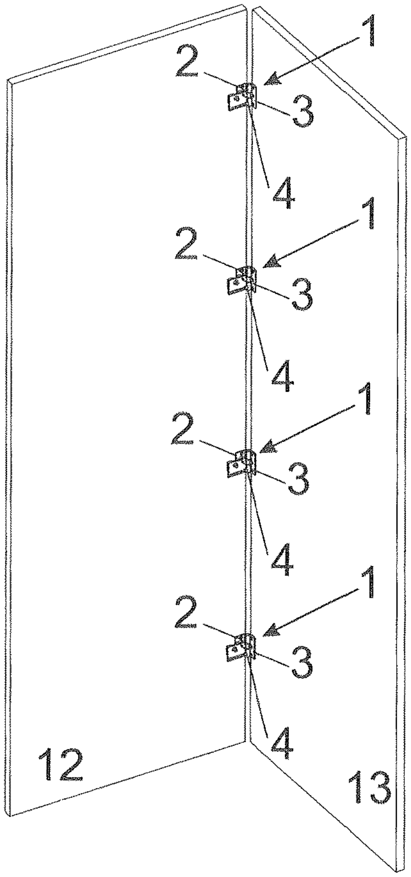
FIG. 1*b* shows a combination of folding doors connected with a plurality of hinges.

FIG. 1*b* shows a carcass door 12 and an outer door 13 connected together by four hinges 1. The folding doors 12, 13 are mounted pivotably relative to each other by the hinges 1.

Figure 2:
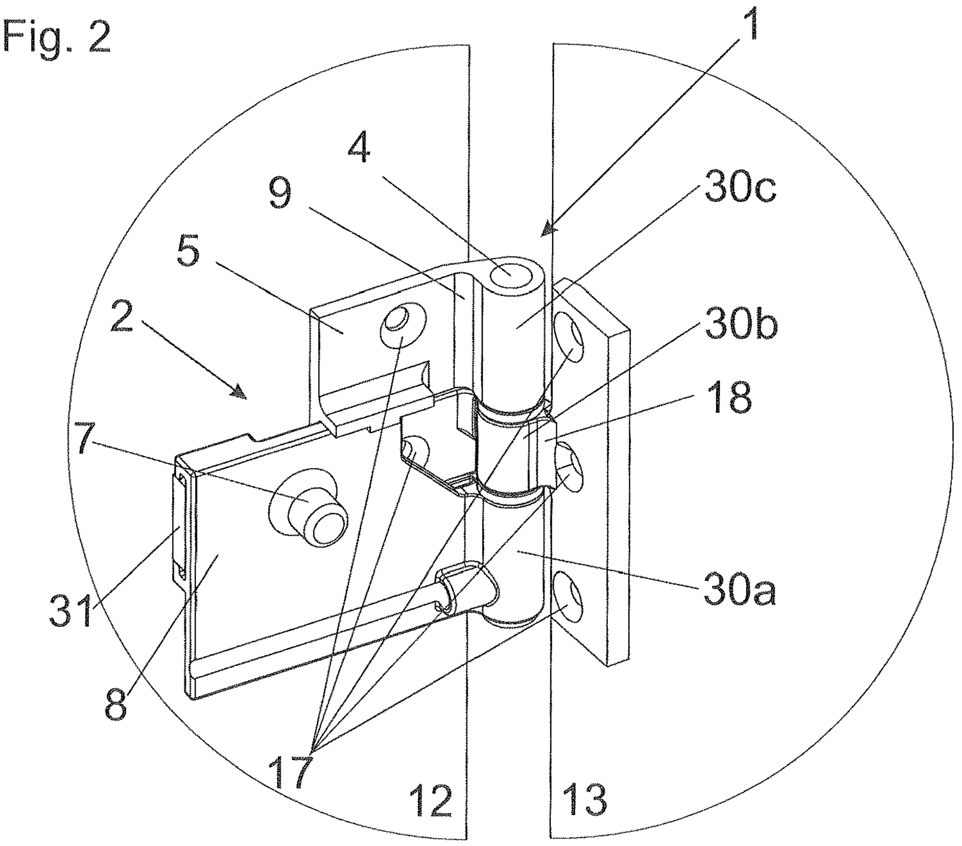
FIG. 2 shows a hinge in the installed condition between two folding doors.

FIG. 2 shows a hinge 1 in the installed condition on a carcass door 12 and an outer door 13, wherein the hinge 1 can be mounted to the folding doors 12, 13 by fixing portions 17. In this embodiment, fixing would be effected by screws. The inner hinge portion 2 of the hinge 1 comprises a main body 5 and a linear slider 8 which contains a lower receiving member 30*a*. The linear slider 8 can be displaced on the main body 5 by a guide arm 31 provided by the main body 5, and the linear slider 8 on the lower receiving member 30*a* in that case encloses the guide arm 31 at the upper and lower edges, by virtue of its configuration. In addition, the main body 5 constitutes a strap 9 which includes the upper receiving member 30*c*. The outer hinge portion 3 which is fixed to the outer door 13, identified by an intermediate strap 18, is seated with its central receiving member 30*b* between the receiving members 30*a* and 30*c* provided by the inner hinge portion 2. The three receiving members 30*a*, 30*b*, 30*c* are connected together by the connecting device 4. As illustrated in FIGS. 2, 3, 4*b*, 5*b*, 6*b*, 7*b*, and 8*b*, the receiving members 30*a*, 30*b*, and 30*c* in the present embodiment are formed as a knuckle or barrel portion of linear slider 8, outer hinge portion 3, and main body 5, respectively. As noted above, the linear slider 8 and the main body 5 form part of the inner hinge portion 2.

Figure 3:
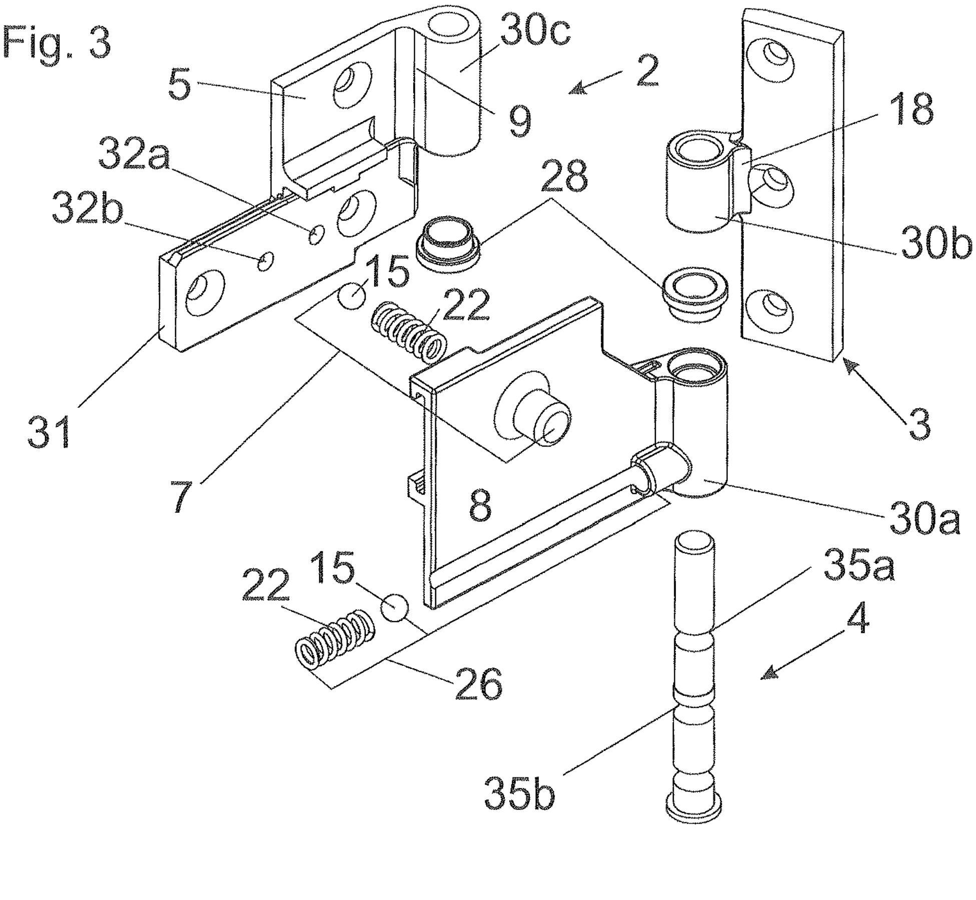
FIG. 3 shows a perspective exploded view of a hinge.

FIG. 3 shows an exploded view of the individual components of the hinge 1. The main body 5 with its guide arm 32 formed thereon has two locking points 32*a* and 32*b*. Subsequently, a ball 15 of the locking element 7 can engage into those locking points 32*a* and 32*b*. In the assembled condition of the inner hinge portion 2, the ball 15 is pressed by a spring 22 into the locking point 32*a* or 32*b*, depending on the position of the linear slider 8. That therefore involves two defined operative regions of the linear slider 8. If the locking element 7 is disposed for example in the first locking point 32*a*, then the lower receiving member 30*a* of the linear slider 8 is at a more exposed position of the inner hinge portion 2 than is the upper receiving member 30*c* on the upper strap 9. In other words, the lower receiving member 30*a* projects further from the inner hinge portion 2 than the upper receiving member 30*c*. If the locking element 7 is at the locking point 32*b*, then the lower receiving member 30*a* is disposed precisely below the upper receiving member 30*c*. In that case, the spring force of the spring 22 is sufficiently strong that the linear slider 8 can no longer be freed of its own accord from its position—not even when, for example, the outer hinge portion 3 together with outer door 13 is fitted to the lower receiving member 30*a* of the linear slider 8.

The connecting device 4 is identified by two mounting regions 35*a* and 35*b*. The mounting regions 35*a* and 35*b* which here are in the form of recesses in the connecting element 4 cooperate with the arresting device 26. The arresting device 26, like also the locking element 7, comprises a spring 22 and a ball 15. The arresting device 26 is a component of the linear slider and acts on the mounting regions 35*a*, 35*b*, that are in the form of recesses, of the connecting device 4. In that case, the spring force of the spring 22 is sufficiently strong to hold the connecting device 4 in position, even in the event of forces acting thereon, exerted by the folding doors 12 and 13. Bearing rings 28 are inserted between the receiving members 30*a*, 30*b* and 30*c* by virtue of the better bearing and sliding properties. That also provides for exact positioning of the receiving members 30*a*, 30*b* and 30*c* relative to each other. In other words, the bearing rings 28 provide a precisely defined position in respect of the intermediate strap 18 between the upper strap 9 and the linear slider 8.

Figure 4A:
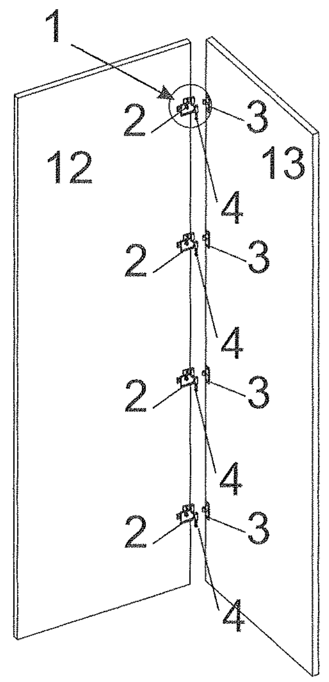

FIG. 4*a* shows a prepared carcass door 12 with a prepared outer door 13, in which the inner hinge portion 2 of the hinge 1 is not yet connected to the outer hinge portion 3. This shows the preparatory mounting step prior to assembly of the folding doors 12 and 13.

Figure 4B:
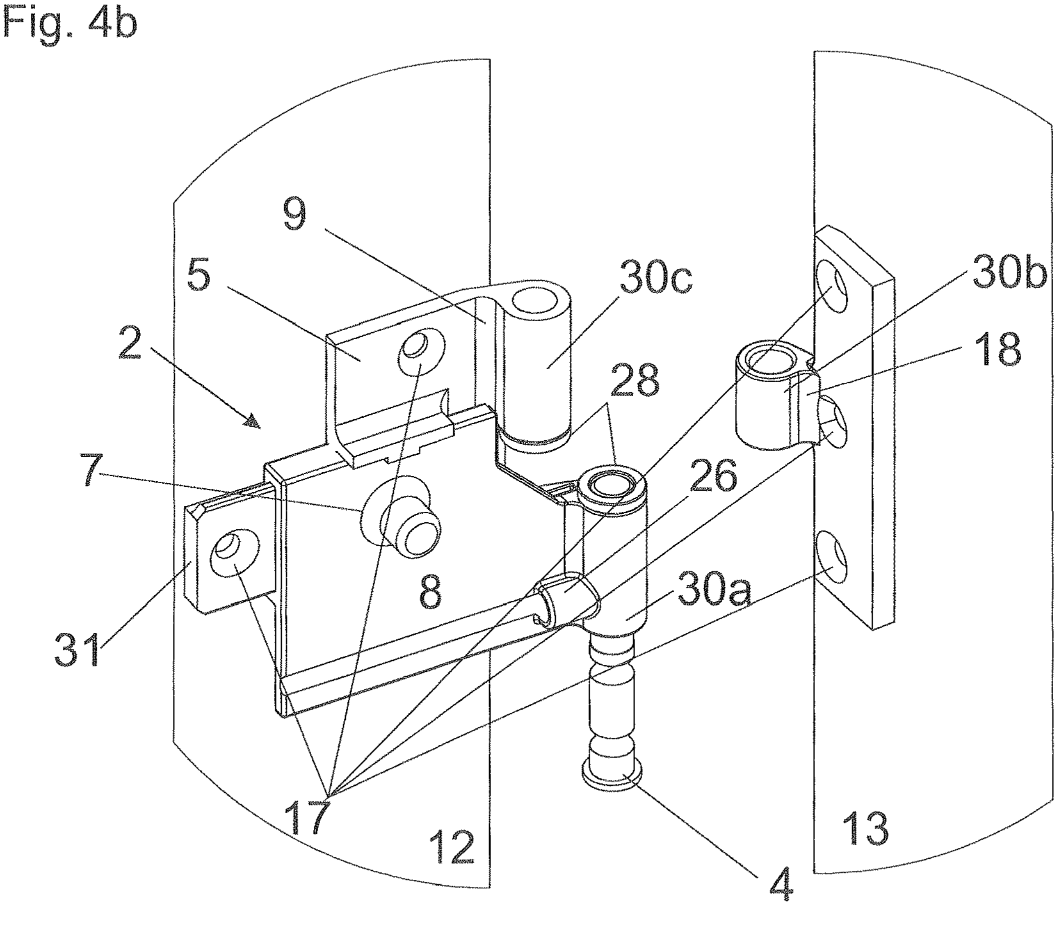

FIG. 4*b* shows a fitted inner hinge portion 2 on a carcass door 12 and an outer hinge portion 3 on an outer door 13 in the condition of not being connected together. The hinge portions 2, 3 can be fitted to the folding doors 12, 13 for example by screws which are fitted to the fixing portion 17. The separable configuration of the hinge portions 2, 3 makes it possible for the hinge portions 2 and 3 to be fitted before the folding doors 12, 13 are aligned. For that purpose, the doors 12, 13 for example can also be placed in the lying condition on the ground or on a work surface and do not have to be mounted in the standing condition. When the hinge portions 2 and 3 are fitted in mutually matching relationship to the folding doors 12, 13, then as the next mounting step each linear slider 8 of the fitted inner hinge portions 2 can be moved into its locking point 32*a* so that it projects further from the inner hinge portions 2. The locking element 7 locks the linear slider 8 in that position. The connecting device 4 can still be left out in that mounting step, or can also be already partly fitted in the lower receiving member 30*a*—at the respective discretion of the person who is assembling the article of furniture. The outer door 13 is now applied with the contact surface of the intermediate strap 18 that is afforded by the upper receiving member 30*c*, on the lower receiving member 30*a*, together with the inserted bearing rings 28. When the central receiving member 30*b* is disposed over the lower receiving member 30*a*, the folding doors 12 and 13 are correctly positioned relative to each other and a first mounting step has been effected.

Figure 5A:
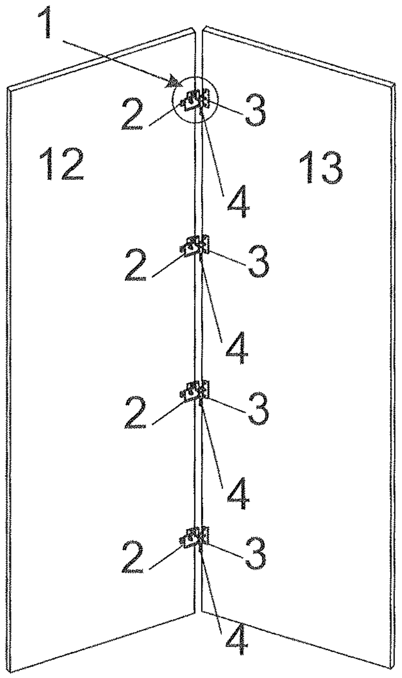

FIG. 5*a* shows the folding doors 12, 13 which have been roughly positioned relative to each other, in which the outer door 13 is resting with its fitted outer hinge portion 3 on the inner hinge portion 2 of the carcass door 12.

Figure 5B:
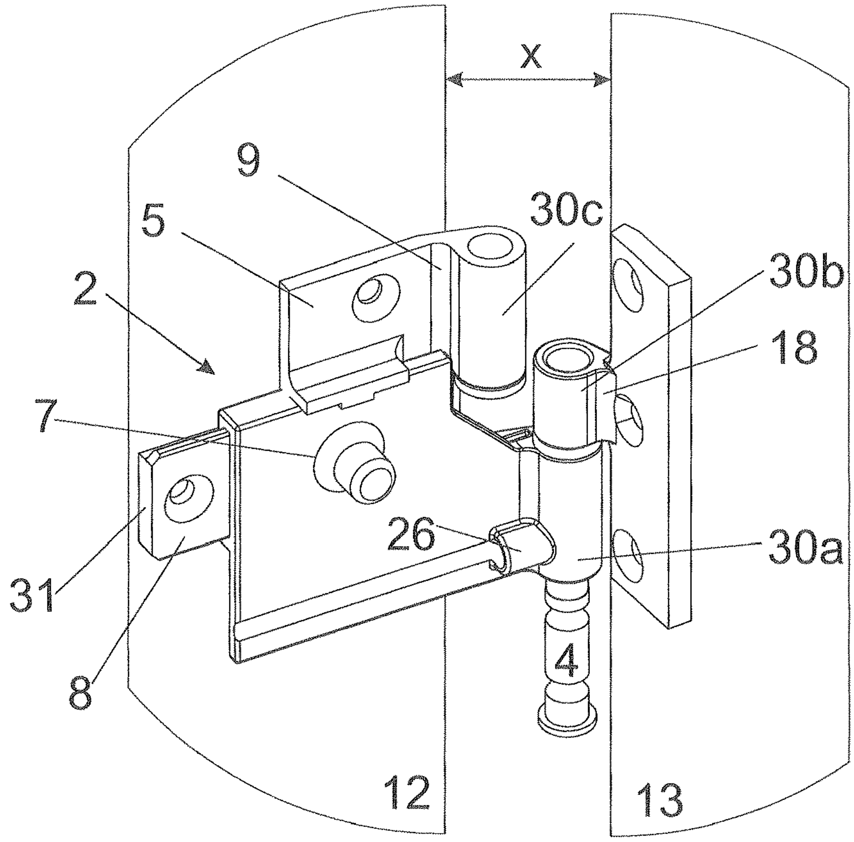

FIG. 5*b* shows in detail how the central receiving member 30*b* is now positioned over the lower receiving member 30*a* and the connecting device 4 can be inserted from below into the lower receiving member 30*a*. It is possible to see the wide gap x between the folding doors 12 and 13, which makes it easier for the outer door 13 to be exactly positioned relative to the carcass door 12 as it is possible to grip both sides of the outer door 13. By virtue of that wide gap x the connecting device 4 can also be accessibly inserted from the exterior. In that case, the risk of injury due to the fingers or hands becoming trapped is less than in the case of commercially usual hinges.

Figure 6A:
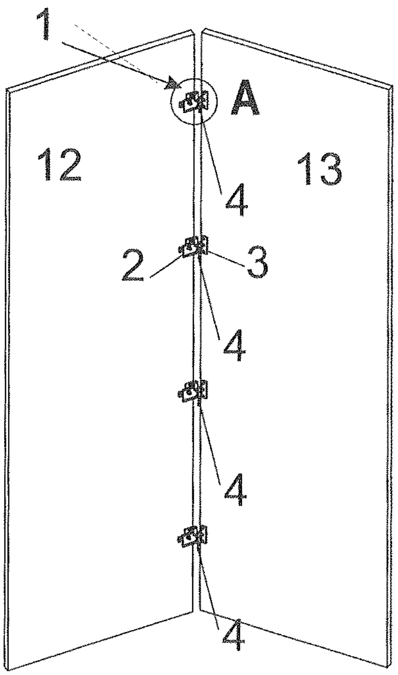

FIG. 6*a* shows two folding doors 12, 13 which are positioned relative to each other by the hinge 1, in which the outer door 13 is now supported on the hinge 1 and no longer has to be held.

Figure 6B:
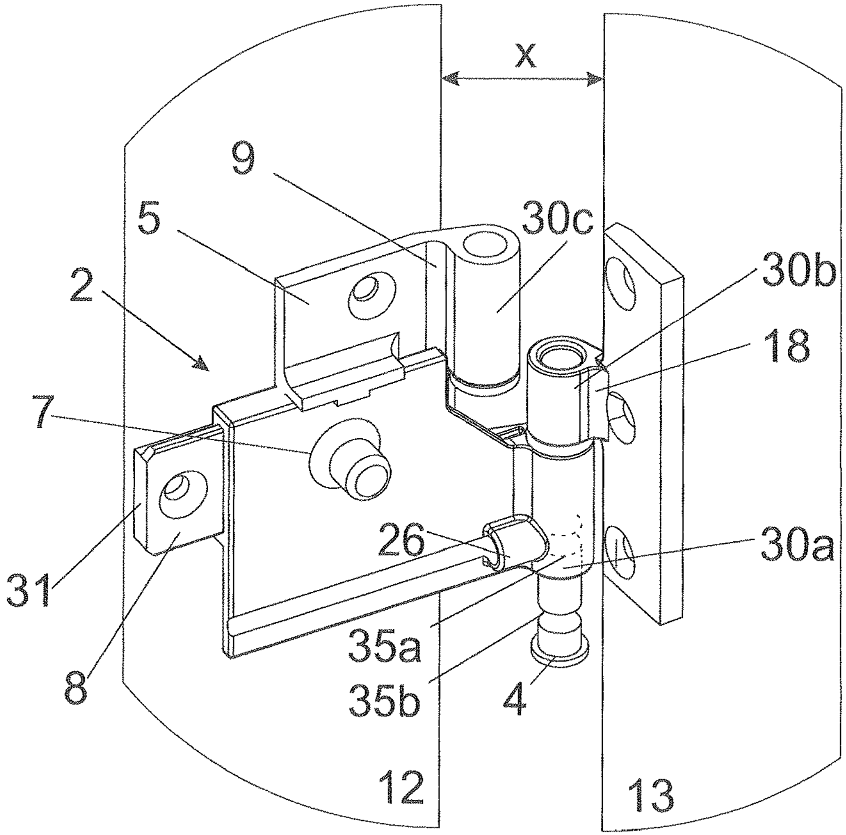

FIG. 6*b* shows how now the connecting device 4 was inserted into its first mounting region 35*a*. The connecting device 4 holds the outer door 13 in the mounting region 35*a* by virtue of the connection to the lower receiving member 30*a* and the central receiving member 30*b*, respectively. When, as shown in FIG. 6*a*, a plurality of hinges are fitted, all connecting devices 4 can be pushed into the mounting regions 35*a*. Due to the resistance which can be felt when the arresting device 26 latchingly engages into the recess of the mounting region 35*a*, or by virtue of a clicking noise which is produced when the ball 15 of the arresting device 26 slides into the recess of the mounting regions 35*a*, 35*b*, it can be found that the connecting device 4 is in the desired mounting region 35*a*, 35*b*.

Figure 7A:
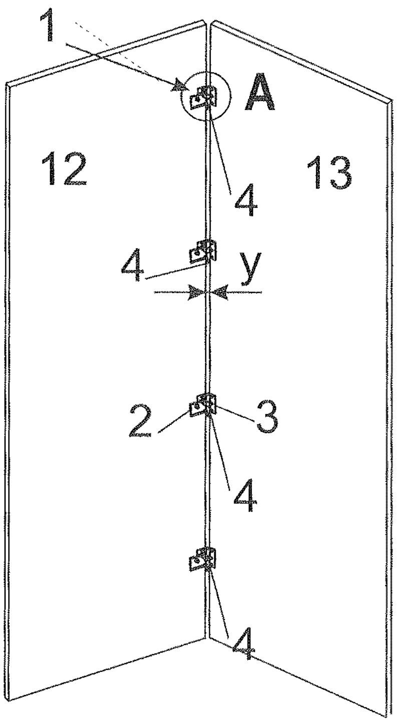

FIG. 7*a* shows one of the last mounting steps when fitting the folding doors 12, 13, with the gap y between the folding doors 12, 13 now being adjusted.

Figure 7B:
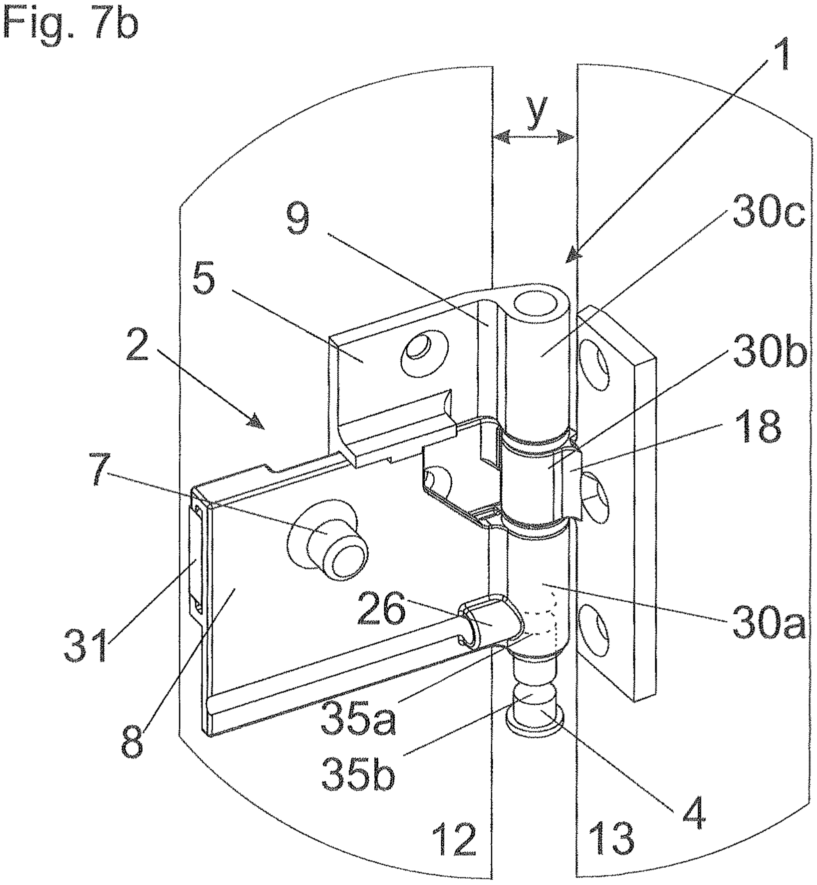

FIG. 7*b* shows in detail the preparatory adaptation of the gap y for subsequent locking of the hinges 1. In order to provide the desired gap between the folding doors 12, 13, the outer door 13 with the mounted outer hinge portions 3 which are connected to the linear slider 8 by the connecting device 4 is now pushed towards the carcass door 12. The force applied in that way exceeds the spring force of the spring 22 in the locking element 7. The ball 15 of the locking element 7, which is prestressed by the spring 22, slips in that case out of the locking point 32*a*. The linear slider 8 moves over the guide arm 31 until the ball 15 of the locking element 7 fits in the locking point 32*b*. When the linear slider 8 is arrested in the locking point 32*b*, the lower receiving member 30*a* of the linear slider 8 jointly with the central receiving member 30*b* of the intermediate strap 18 is disposed exactly under the upper receiving member 30*c* of the upper strap 9. The gap y between the carcass door 12 and the outer door 13 has thus been adjusted, and locking by the connecting device 4 is implemented.

Figure 8A:
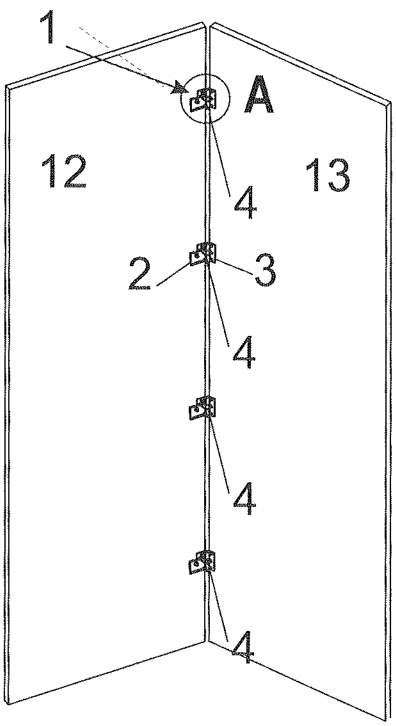

FIG. 8*a* shows a carcass door 12 and an outer door 13 in the finished assembled, locked condition of the hinge 1.

Figure 8B:
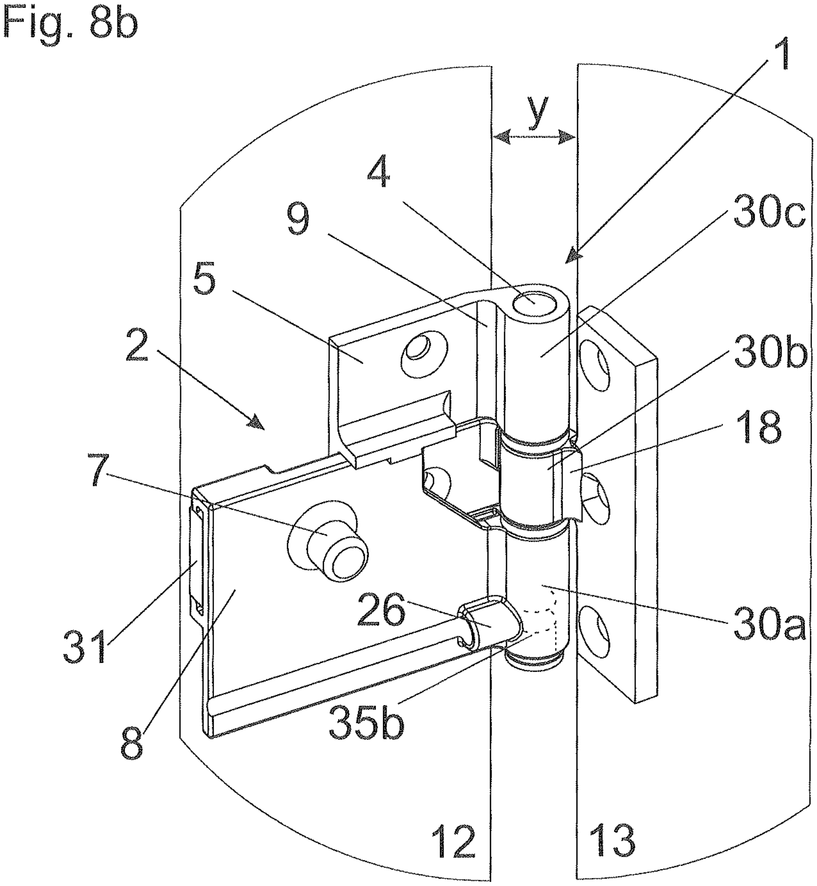

FIG. 8*b* shows how the connecting device 4 was inserted completely into the receiving members 30*a*, 30*b*, 30*c*. That represents the mounting region 35*b* of the connecting element 4 in cooperating relationship with the arresting device 26. The weight of the outer door 13 therefore no longer hangs on the ball 15 of the locking element 7 prestressed by the spring 22, but is carried by the connection between the receiving member 30*c* of the upper strap 9 and the connecting device 4 in cooperating relationship with the lower receiving member 30*a* of the linear slider 8.

If the folding doors 12, 13 must be separated from each other, it is only necessary for the connecting device 4 to be pulled downwardly until it latches into the mounting region 35*a*. Subsequently, the linear slider can be pulled into the locking point 32*a* by pulling on the outer door 13. Thus, the outer door 13 can be separated from the carcass door 12 by stepwise removal of the connecting devices 4.

The invention claimed is:

1. A hinge comprising:

an inner hinge portion to be fixed to a furniture body or to a furniture door pivotably mounted to the furniture body, an outer hinge portion to be fixed to an outer door, the inner hinge portion and the outer hinge portion collectively having a lower receiving member, an upper receiving member, and a central receiving member, and a connecting device slideable in an inserting direction into the lower receiving member, the central receiving member, and the upper receiving member so as to pivotably connect the inner hinge portion to the outer hinge portion, wherein the inner hinge portion has a main body to be fixed to the furniture body or to the furniture door pivotably mounted to the furniture body, and the lower receiving member is slidable in a sliding direction relative to the upper receiving member mounted to the main body, the sliding direction being transverse to the inserting direction of the connecting device.

2. The hinge as set forth in claim 1, further comprising a locking element configured to lock the lower receiving member at at least one locking point relative to the main body.

3. The hinge as set forth in claim 2, wherein, at a first locking point of the lower receiving member, the lower receiving member projects further from the inner hinge portion than the upper receiving member.

4. The hinge as set forth in claim 2, wherein the outer hinge portion has the central receiving member to be fitted on the lower receiving member.

5. The hinge as set forth in claim 2, wherein the locking element comprises a ball acted upon by a spring, the ball being configured to latch into at least one recess for receiving the ball.

6. The hinge as set forth in claim 2, wherein, at a second locking point of the lower receiving member, the lower receiving member overlaps with the upper receiving member and the connecting device extends through the lower receiving member and the upper receiving member.

7. The hinge as set forth in claim 2, wherein, at a second locking point of the lower receiving member, the connecting device extends through the lower receiving member, the central receiving member, and the upper receiving member.

8. The hinge as set forth in claim 1, wherein the connecting device has at least two separate mounting regions.

9. The hinge as set forth in claim 8, wherein, when the connecting device is disposed in a first mounting region, the connecting device is located only within the lower receiving member and the central receiving member.

10. The hinge as set forth in claim 8, wherein, when the connecting device is disposed in a second mounting region, the connecting device is located within the lower receiving member, the central receiving member, and the upper receiving member.

11. The hinge as set forth in claim 1, further comprising an arresting device for locking the connecting device in at least one mounting region.

12. The hinge as set forth in claim 11, wherein the arresting device comprises a ball acted upon by a spring, the ball being configured to latch into at least one recess provided for receiving the ball.

13. An article of furniture comprising the hinge as set forth in claim 1.

14. The hinge as set forth in claim 1, wherein the upper receiving member is rigidly mounted to the main body.

15. The hinge as set forth in claim 1, wherein the inner hinge portion comprises the main body and a linear slider, the main body having the upper receiving member thereon, and the linear slider having the lower receiving member thereon, the main body being configured to slide along and relative to the linear slider in the sliding direction transverse to the inserting direction of the connecting device.

16. The hinge as set forth in claim 15, further comprising a locking element arranged between the main body and the linear slider, the locking element being configured to lock the linear slider having the lower receiving member at at least one locking point relative to the main body having the upper receiving member.

* * * * *